(12) United States Patent
Kosaka (10) Patent No.: US 6,982,535 B2
(45) Date of Patent: Jan. 3, 2006

(54) FEEDER

(75) Inventor: Kouji Kosaka, Hachiouji (JP)

(73) Assignees: Japan Science & Technology Agency, Kawaguchi (JP); Kumamoto Technology Incorporated, Kumamoto-ken (JP)

( * ) Notice: Subject to any disclaimer, the term of this patent is extended or adjusted under 35 U.S.C. 154(b) by 0 days.

(21) Appl. No.: 10/502,626

(22) PCT Filed: Jun. 28, 2002

(86) PCT No.: PCT/JP02/06551

§ 371 (c)(1),
(2), (4) Date: Jul. 26, 2004

(87) PCT Pub. No.: WO2004/003930

PCT Pub. Date: Jan. 8, 2004

(65) Prior Publication Data

US 2005/0218851 A1    Oct. 6, 2005

(51) Int. Cl.
*B23Q 5/28* (2006.01)

(52) U.S. Cl. .................. 318/575; 318/560; 901/19; 901/23; 700/185

(58) Field of Classification Search ........... 318/575, 318/560; 901/19, 23, 245; 700/185

See application file for complete search history.

(56) References Cited

U.S. PATENT DOCUMENTS

| | | | | |
|---|---|---|---|---|
| 3,641,927 A | * | 2/1972 | Ballard | 100/98 R |
| 3,699,808 A | * | 10/1972 | Ford et al. | 73/772 |
| 4,027,213 A | * | 5/1977 | de Valroger | 318/138 |
| 4,343,993 A | * | 8/1982 | Binnig et al. | 250/306 |
| 4,506,154 A | * | 3/1985 | Scire | 250/442.11 |
| 4,618,938 A | * | 10/1986 | Sandland et al. | 382/148 |
| 4,902,944 A | * | 2/1990 | Daggett et al. | 318/568.11 |
| 5,103,095 A | * | 4/1992 | Elings et al. | 250/306 |
| 5,319,960 A | * | 6/1994 | Gamble et al. | 73/105 |
| 5,428,281 A | * | 6/1995 | Seki et al. | 318/696 |
| 6,225,767 B1 | * | 5/2001 | Lovett et al. | 318/254 |
| 6,384,560 B1 | * | 5/2002 | Kakino et al. | 318/566 |

FOREIGN PATENT DOCUMENTS

| | | |
|---|---|---|
| JP | 5-137352 | 6/1993 |
| JP | 7-9266 | 1/1995 |
| JP | 2903615 | 3/1999 |
| JP | 2000-156053 | 6/2000 |
| JP | 2001-293630 | 10/2001 |
| JP | 2001-337186 | 12/2001 |

* cited by examiner

*Primary Examiner*—Rita Leykin
(74) *Attorney, Agent, or Firm*—Manabu Kanesaka (57) ABSTRACT

In a feed drive apparatus wherein a moving element 27 is driven by drive legs 21, 22 having extension/contraction deforming parts 23 and shear deforming parts 24, sine wave drive voltages are respectively applied to the extension/contraction deforming parts 23 and shear deforming parts 24 of the drive legs 21, 22 in order to permit high speed operation, and make the average voltage effectively zero.

9 Claims, 13 Drawing Sheets

Two leg set sine wave drive

Fig. 12

Three leg set sine wave drive

FEEDER

FIELD OF THE INVENTION

This invention relates to a feed drive apparatus, and in particular to a feed drive apparatus provided with a drive leg having an extension/contraction deforming part and a shear deforming part, wherein the deformation of the extension/contraction deforming part and the shear deforming part are used to drive a moving element.

BACKGROUND OF THE INVENTION

JP-B 03-81119 discloses a feed drive apparatus provided with a drive leg having an extension/contraction deforming part and a shear deforming part, wherein the extension/contraction deforming part is extended so that the tip of a drive leg comes in contact with the moving element or with a fixed side and the shear deforming part deforms in the drive direction or the reverse direction to drive a moving element.

This feed drive apparatus drives the moving element using an approach similar to the principle of human ambulation. When the tip of the drive leg is brought in contact with the moving element or the fixed side to cause a shear deformation, the moving element is driven by the frictional force generated between the tip of the drive leg, and the moving element or the fixed side.

Figure 21:
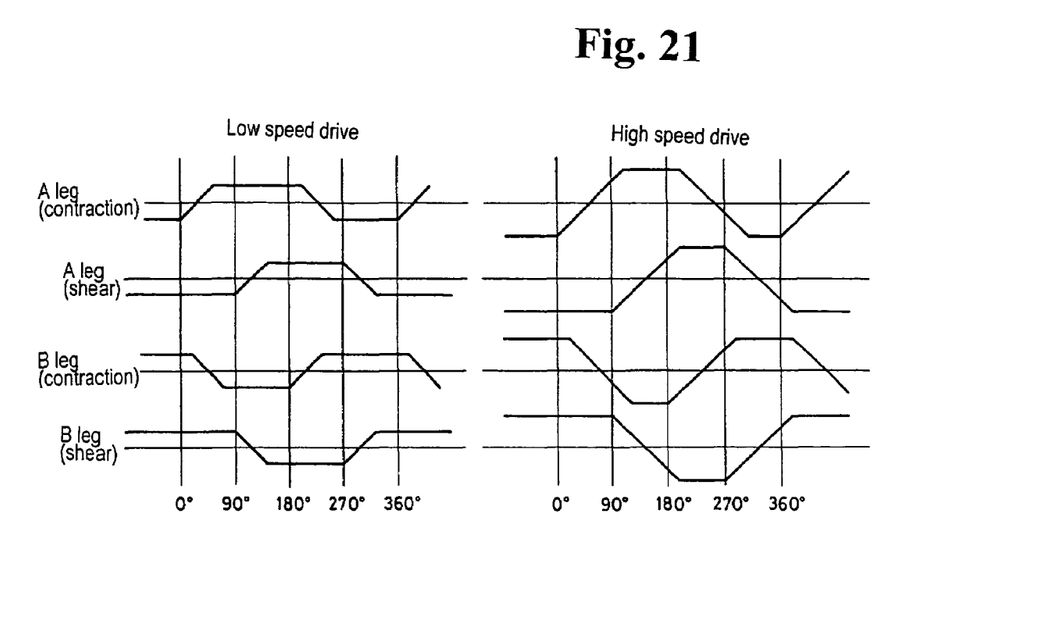
FIG. 21 is a waveform diagram showing a voltage variation of the drive legs in a prior art feed drive apparatus.

FIG. 21 shows the voltage applied to the extension/contraction deforming part and shear deforming part of the feed drive apparatus which has two types of drive legs, i.e., an A leg and a B leg, respectively. Herein, a square wave-like drive voltage is applied to the extension/contraction deforming part and the shear deforming part, respectively, and the voltage is controlled by a cycle of 6 phases with a phase difference of 60° which respectively overlap by 30° at a time. However, the piezoelectric elements forming the extension/contraction deforming part and shear deforming part act as capacitors, so the waveform is actually a trapezoidal wave-like voltage.

In such a feed drive apparatus, to increase the drive speed, the drive voltage frequency is not changed, and the voltage applied to the shear deforming part is increased. However, if the voltage is increased, the piezoelectric element forming the shear deforming part acts as a capacitor, and the shear deformation time will become longer due to the time constant. Thus, a shear deformation occurs even when the drive leg in which this shear deforming part is provided does not touch the moving element, and a shear deformation occurs when the other drive leg is not completely separated from the moving element. This prevents a high drive speed from being attained.

Figure 22:
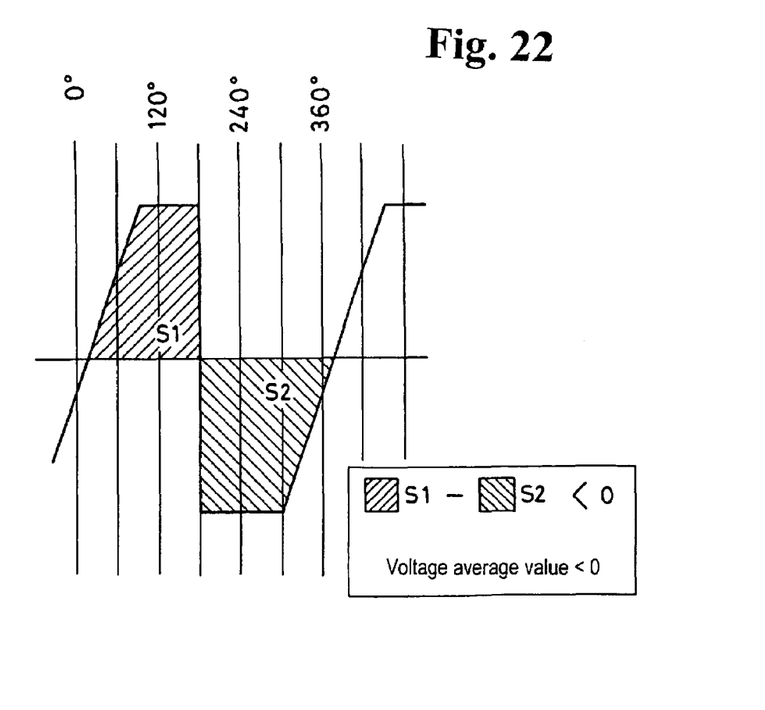
FIG. 22 is an enlarged waveform diagram showing a voltage variation.

When a drive voltage as shown in FIG. 21 is applied to a drive leg, the charge and discharge time constants of the extension/contraction deforming part or the shear deforming part comprising piezoelectric elements differ depending on whether the voltage is positive or negative, and as this is a sequence, the extension time and contraction time are not necessarily equal. FIG. 22 shows the voltage changes applying to these deforming parts. If the voltage applied to the deforming parts is integrated, the integral value, i.e., the average of the voltage, will be negative. This is one factor leading to depolarization of the piezoelectric element, and a shorter lifetime of the piezoelectric element.

SUMMARY OF THE INVENTION

It is therefore an object of this invention, which was conceived in view of the above problems, to provide a feed drive apparatus which has high speed drive and which is not subject to the problem of depolarization.

It is another object of this invention to permit application of a drive voltage by means of a drive circuit of simple construction which has stable operation without any significant load on the drive circuit or power supply even at high drive speeds.

It is another object of this invention to prevent unnecessary slipping of a drive leg and reduce the load on the drive power supply in a feed-drive apparatus which drives a moving element by deforming the drive leg.

It is yet another object of this invention to construct a reliable drive apparatus wherein the moving element is driven in the drive direction gripped between drive leg disposed on either side thereof.

One invention of this application relates to a feed drive apparatus provided with a drive leg having an extension/contraction deforming part and a shear deforming part, the extension/contraction deforming part being extended so that the tip of a drive leg contacts with the moving element or with a fixed side, the shear deforming part deforms laterally in the drive direction or the reverse direction to drive a moving element, wherein sine wave drive voltages are respectively applied to the extension/contraction deforming part and the shear deforming part.

Herein, the phase of the sine wave drive voltage applied to the extension/contraction deforming part and the phase of the sine wave drive voltage applied to the shear deforming part may be mutually offset by approximately 90°. If there are n types of drive legs, the phases of the respective drive voltages applied to the extension/contraction deforming parts and the shear deforming parts may be shifted by 360°/n.

In the case of a drive apparatus having two types of drive legs, the phases of the drive voltages applied to the extension/contraction deforming parts and the shear deforming parts may be mutually offset by approximately 180°, and the phases of the drive voltages applied to the extension/contraction deforming parts and the shear deforming parts of each drive leg may be mutually offset by approximately 90°. In the case of a drive apparatus having three types of drive legs, the phases of the drive voltages applied to the extension/contraction deforming parts and the shear deforming parts may be mutually offset by approximately 120°, and the phases of the drive voltages applied to the extension/contraction deforming part and the shear deforming part of each drive leg may be mutually offset by approximately 90°.

Another invention of this application relates to a feed drive apparatus provided with a drive leg having an extension/contraction deforming part and a shear deforming part, the extension/contraction deforming part being extended so that the tip of a drive leg contacts with the moving element or with a fixed side, the shear deforming part deforms laterally in the drive direction or the reverse direction to drive a moving element, wherein sine wave drive voltages are respectively applied to the extension/contraction deforming part and the shear deforming part, and the tip of the drive leg moves along a substantially elliptical path.

Yet another invention of this application relates to a feed drive apparatus provided with a drive leg having an extension/contraction deforming part and a shear deforming part, the extension/contraction deforming part being extended so that the tip of a drive leg contacts with the moving element or with a fixded side, the shear deforming part deforms laterally in the drive direction or the reverse direction to drive a moving element, wherein sine wave drive voltages are respectively applied to the extension/contraction deforming part and the shear deforming part, and the drive legs are disposed on either side of a driving element so that they are effectively facing each other substantially at right angles to the drive direction of the moving element, and the moving element is gripped by the drive legs on either side when it is driven.

Herein, the drive legs may be attached to the base side, and the moving element may be installed on a stage supported free to move in the drive direction relative to the base. An X-axis stage and Y-axis stage may be superimposed, the X-axis stage and Y-axis stage being supported free to move respectively in the X-axis direction and Y-axis direction, and the X-axis stage and Y-axis stage respectively being driven by drive legs in the X-axis direction and Y-axis direction.

In a preferred aspect of the main invention of the application, the drive apparatus comprises a pair of drive legs comprising laminar piezoelectric elements which are driven by sine wave drive voltages having a 90° phase difference respectively applied to the extension/contraction deforming part and shear deforming part of the same drive legs, and sine wave voltages having a 180° phase difference respectively applied to the extension/contraction deforming parts and shear deforming parts of the pair of drive legs, the tips of the pair of drive legs moving along elliptical paths and the tips of the pair of drive legs being moved alternately. Thus, the moving element is moved in contact with the tips of the pair of drive legs. When three or more types of drive legs are used, the moving element is constantly restrained and moved at high speed by driving the respective deforming parts having a phase difference of 360°/number of leg types relative to corresponding deforming parts.

In the case of the square wave drive of the prior art feed drive apparatus, the average value of the positive and negative voltages tended to be negative, and this led to depolarization of the peizoelectric elements forming the extension/contraction deforming part and shear deforming part of the drive legs. However, according to this aspect of the invention, the average voltage is zero, so there are fewer factors leading to depolarization. Also, compared to the case of a square wave drive voltage, for a sine wave, the load of the drive circuit and power supply is less.

For a drive with two types of drive legs, a transient state occurs when the moving element is not restrained during the change-over. However, when there are three or more types of drive legs, this problem is resolved, and the moving element can be constantly restrained. Therefore, the positional precision of the moving element is improved when there are three types as compared to two types of drive legs.

According to a main invention of this application, in a feed drive apparatus provided with a drive leg having an extension/contraction deforming part and a shear deforming part, wherein the extension/contraction deforming part is extended so that the tip of a drive leg comes in contact with the moving element or with a fixed side and the shear deforming part deforms laterally in the drive direction or the reverse direction to drive the moving element, sine wave drive voltages are respectively applied to the extension/contraction deforming part and the shear deforming part.

Therefore, in the feed drive apparatus having the aforesaid construction, the drive voltage can be applied by a drive circuit having a simple construction, and stable operation can be performed even at high speed without a high load acting on the drive circuit or power supply.

According to another main invention of this application, in a feed drive apparatus provided with a drive leg having an extension/contraction deforming part and a shear deforming part, wherein the extension/contraction deforming part is extended so that the tip of a drive leg comes in contact with the moving element or with a fixed side and the shear deforming part deforms laterally in the drive direction or the reverse direction to drive a moving element, sine wave drive voltages are respectively applied to the extension/contraction deforming part and the shear deforming part and the tips of the drive legs move along substantially elliptical paths.

Therefore, by alternately moving the drive legs whereof the tips move along substantially elliptical paths, when one drive leg is deformed by shear to move the moving element, the extention/contraction deforming part of this drive leg is effectively fully extended. At this time, the extension/contraction deforming part of the drive leg on the opposite side is effectively fully contracted, and its tip is separated from the moving element. Due to this, unnecessary slipping is prevented, and the load on the drive power supply is reduced.

According to yet another main invention of this application, in a feed drive apparatus provided with a driving leg having an extension/contraction deforming part and a shear deforming part, wherein the extension/contraction deforming part is extended so that the tip of a drive leg comes in contact with the moving element or with a fixed side, the shear deforming part deforms laterally by shear in the drive direction or the reverse direction to drive a moving element, sine wave drive voltages are respectively applied to the extension/contraction deforming part and the shear deforming part, the drive legs are disposed on either side of the moving element so that they are effectively facing each other substantially at right angles to the drive direction of the moving element, and the moving element is gripped by the drive legs on either side when it is driven.

Therefore, according to this feed drive apparatus, the moving element is moved while gripped by the drive legs disposed on either side, so a reliable drive can be obtained.

DESCRIPTION OF THE PREFERRED EMBODIMENTS

Figure 1:
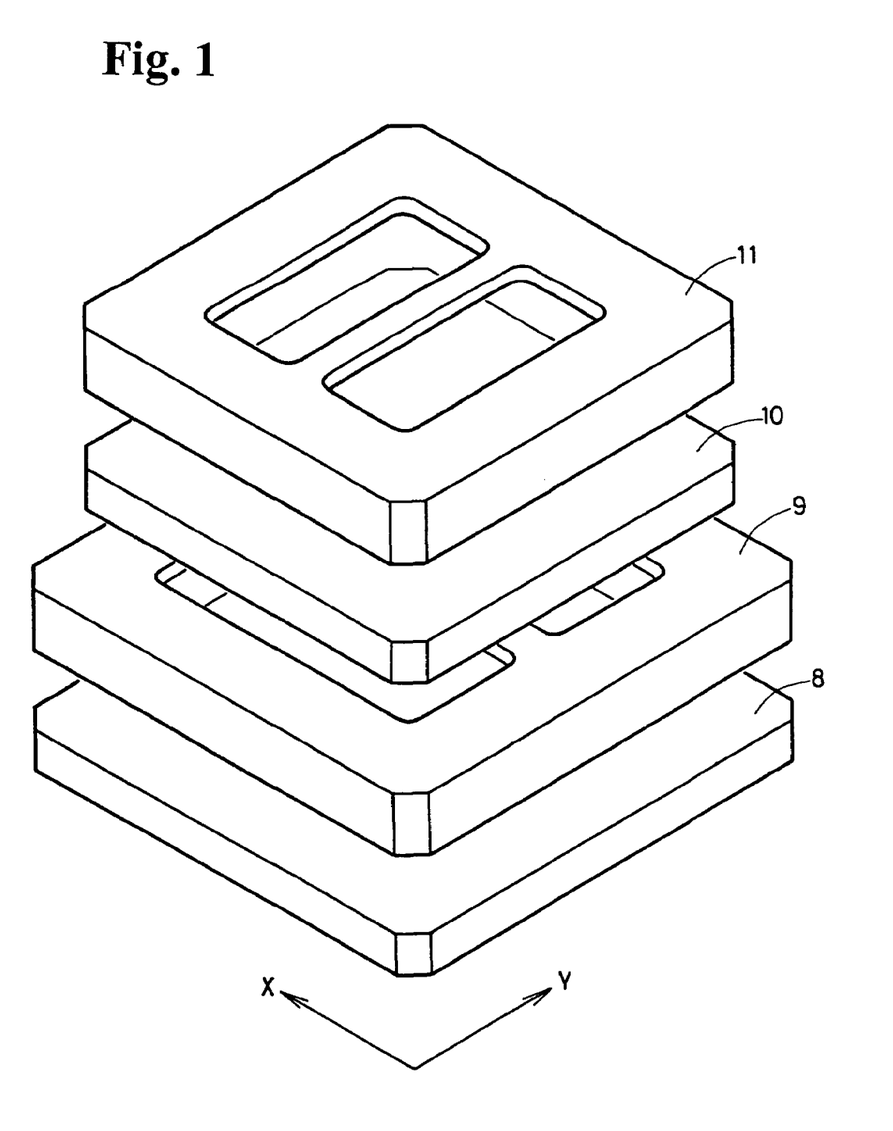
FIG. 1 is an exploded perspective view of an X-Y stage.

An embodiment of this invention will now be described referring to the drawings. This aspect of the invention relates to a precision drive X-Y stage drive apparatus. As shown in FIG. 1, this X-Y stage drive apparatus comprises an X-axis base 8, an X-axis stage 9, a Y-axis base 10 and a Y-axis stage 11. The X-axis stage 9 is supported free to move in the X-axis direction on the X-axis base 8. The Y-axis base 10 is fixed on the X-axis stage 9. The Y-axis stage 11 is supported free to move in the Y-axis direction on the Y-axis base 10. This construction therefore provides a two-axis stage, i.e., an X-Y stage.

FIG. 2–FIG. 5 show a combination of the X-axis base 8 and X-axis stage 9, i.e., a mechanism for moving the X-axis stage 9 in the X-axis direction on the X-axis base 8. On the other hand, FIG. 6–FIG. 9 show a mechanism which supports the Y-axis stage 11 free to move in the Y-axis direction relative to the Y-axis base 10. The X-axis direction drive mechanism and Y-axis direction drive mechanism have identical constructions, so only the displacement mechanism for the Y-axis stage 11 shown in FIG. 6–FIG. 9 will be described here.

Figure 8:
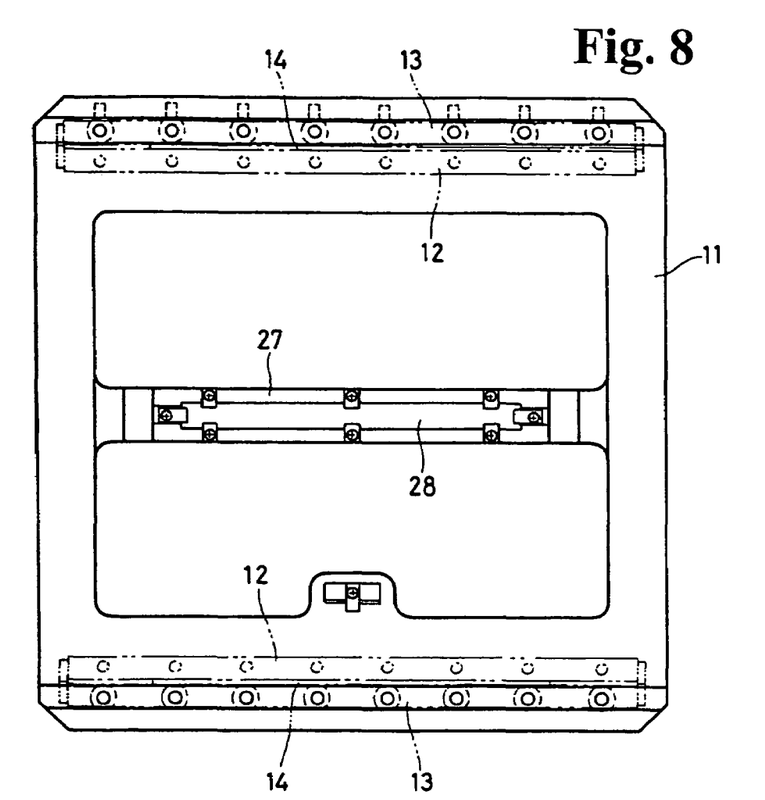
FIG. 8 is a base plan diagram of the Y-axis stage.
Figure 9:
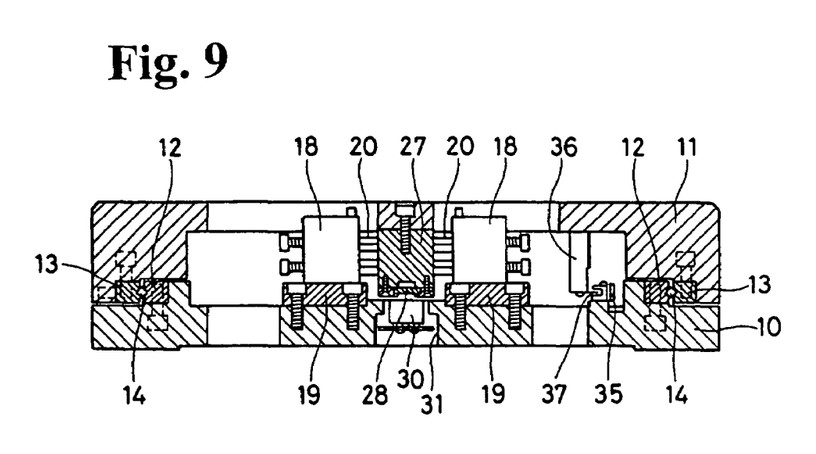
FIG. 9 is a cross-sectional diagram of the X-axis stage drive apparatus taken through a line D—D in FIG. 6.

A pair of rails 12 are provided on both sides on the Y-axis base 10. Rails 13 are also provided on both sides on the undersurface of the Y-axis stage 11, as shown in FIG. 8 and FIG. 9. The rails 12 on the sides of the base 10 and the rails 13 on the sides of the stage 11 are arranged so that their side faces are opposite each other, moving elements 14 being interposed between these rails 12, 13 as shown in FIG. 9. The rails 12, 13 and moving elements 14 form a so-called cross-roller, this cross-roller supporting the Y-axis stage 11 so that it can slide in the length direction of the rails 12, 13, i.e., the Y-axis direction on the Y-axis base 10.

Figure 6:
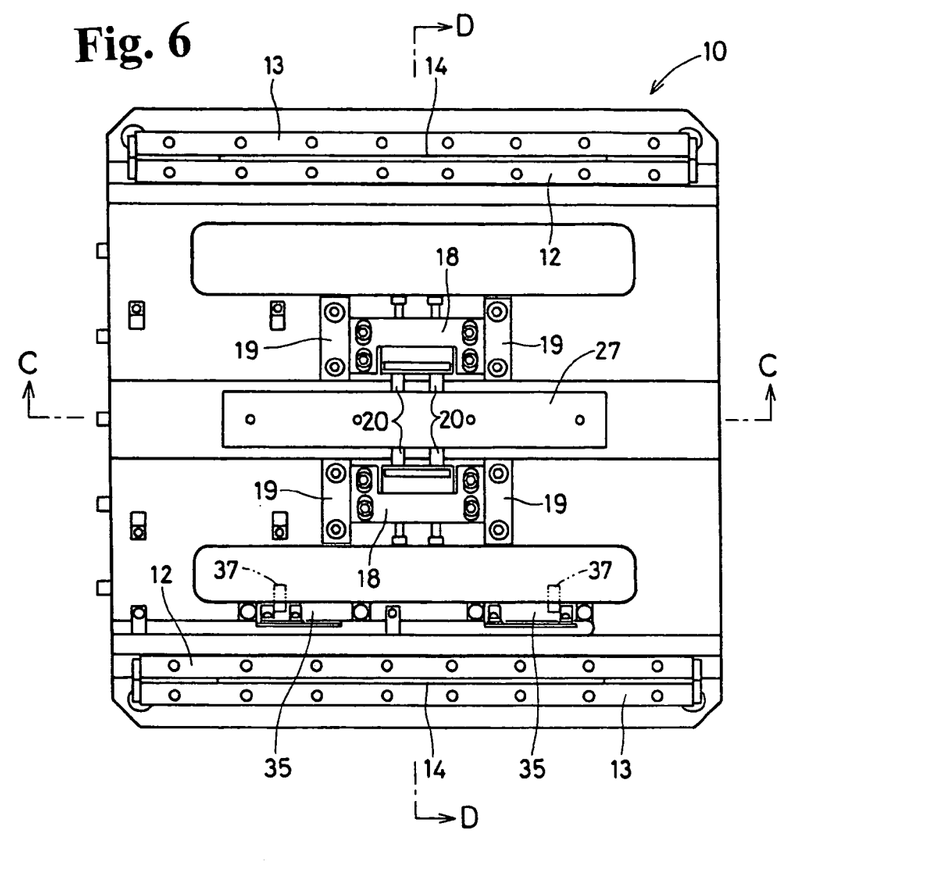
FIG. 6 is a plan view of the base of a Y-axis stage drive apparatus.
Figure 10:
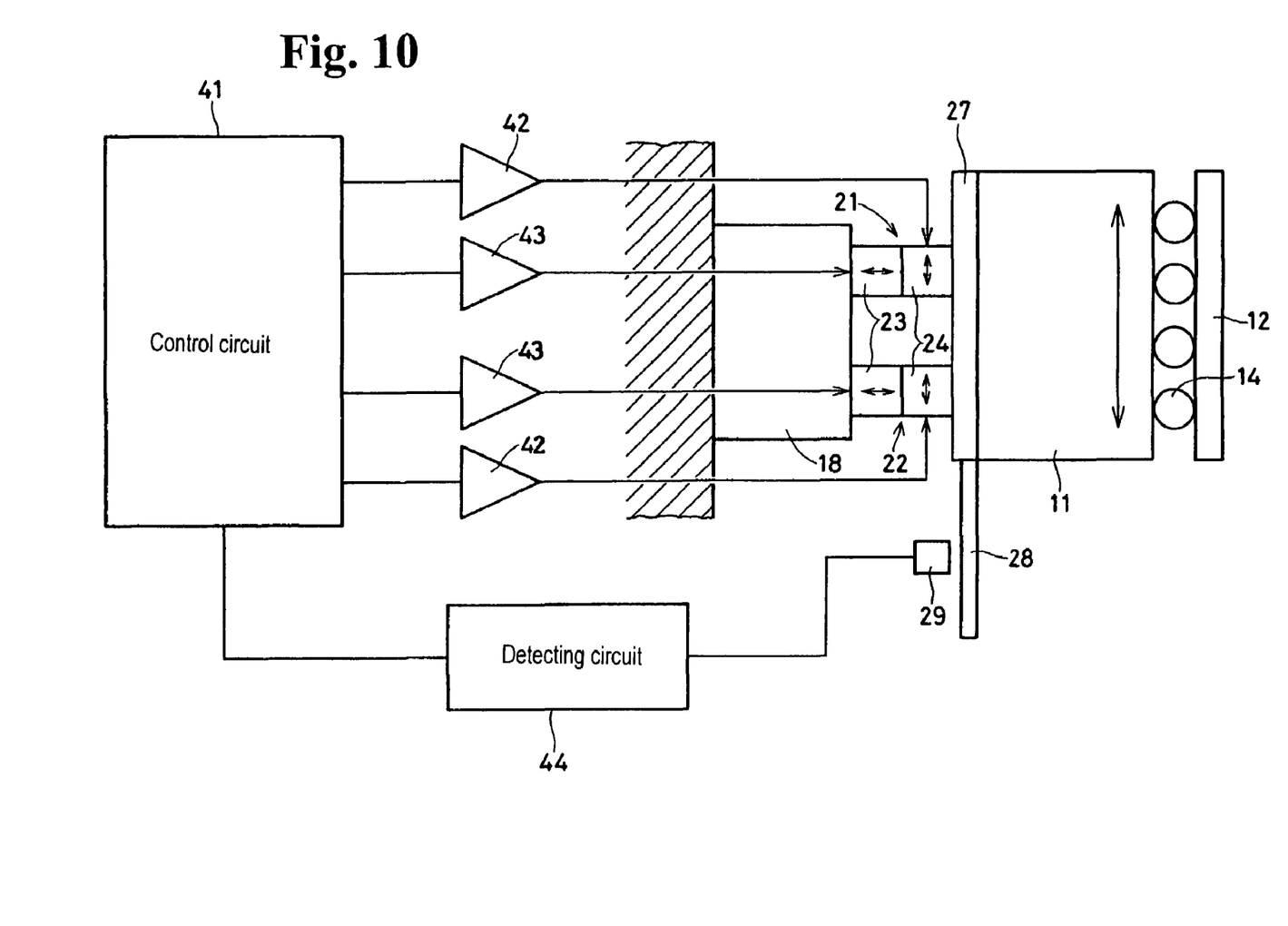
FIG. 10 is a block diagram of a drive circuit which drives a drive unit.

A pair of drive units 18 are installed so as to opposite to each other on the base 10, as shown in FIG. 6 and FIG. 9. The parts of these drive units 18 on both sides are fixed on the base 10 by pressure plates 19. This pair of drive units 18 further comprises drive legs 21, 22. These drive legs 21, 22 respectively comprise an extension/contraction deforming part 23 and a shear deforming part 24, as shown in FIG. 10. The extension/contraction deforming part 23 is polarized in its extension/contraction direction, i.e., the length direction, whereas the shear deforming part 24 is polarized in the horizontal or lateral direction.

A moving element 27 comprising a ceramic plate having a rectilinear rod shape shown in FIG. 6 and FIG. 9 is attached to the undersurface of the stage 11 so that it is gripped by the drive legs 21, 22 of the drive units 18 on both sides. Therefore, when the moving element 27 is moved by the drive legs 21, 22 of the drive units 18, the stage 11 to which the moving element 27 is attached, is guided by the guide rails 12, 13 and the moving element 27 moves in the length direction, i.e., the Y-axis direction.

Figure 7:
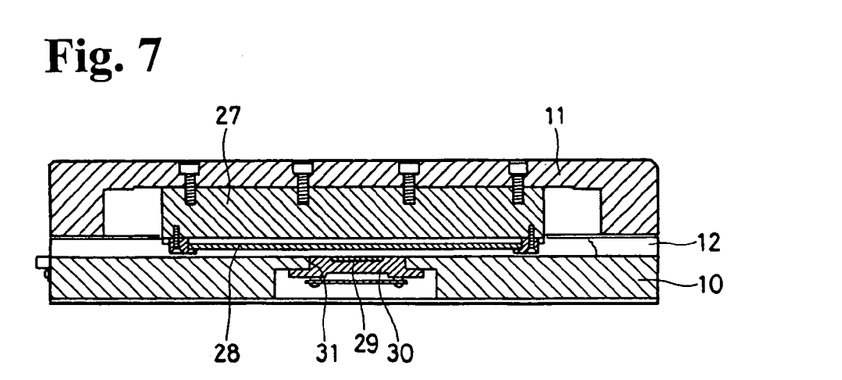
FIG. 7 is a cross-sectional view of the Y-axis stage drive apparatus taken through a line C—C in FIG. 6.

This movement of the stage 11 or moving element 27 is detected by a linear scale 28 shown in FIG. 7–FIG. 9. The linear scale 28 is fixed to the undersurface of the moving element 27. A detecting head 29 which detects the linear scale 28 is fitted on the base 10. The detecting head 29 is held in a head base 30, this head base 30 being arranged facing an opening 31 in the base 10.

Next, the detecting mechanism which detects the displacement stroke of the stage 11 will be described. A limit sensor 35 is installed at a position adjacent to the rails 12 on the base 10, as shown in FIG. 6. This limit sensor 35 optically detects a detection plate 37 which is attached to the undersurface of the stage 11 via a bracket 36, as shown in FIG. 9.

Figure 2:
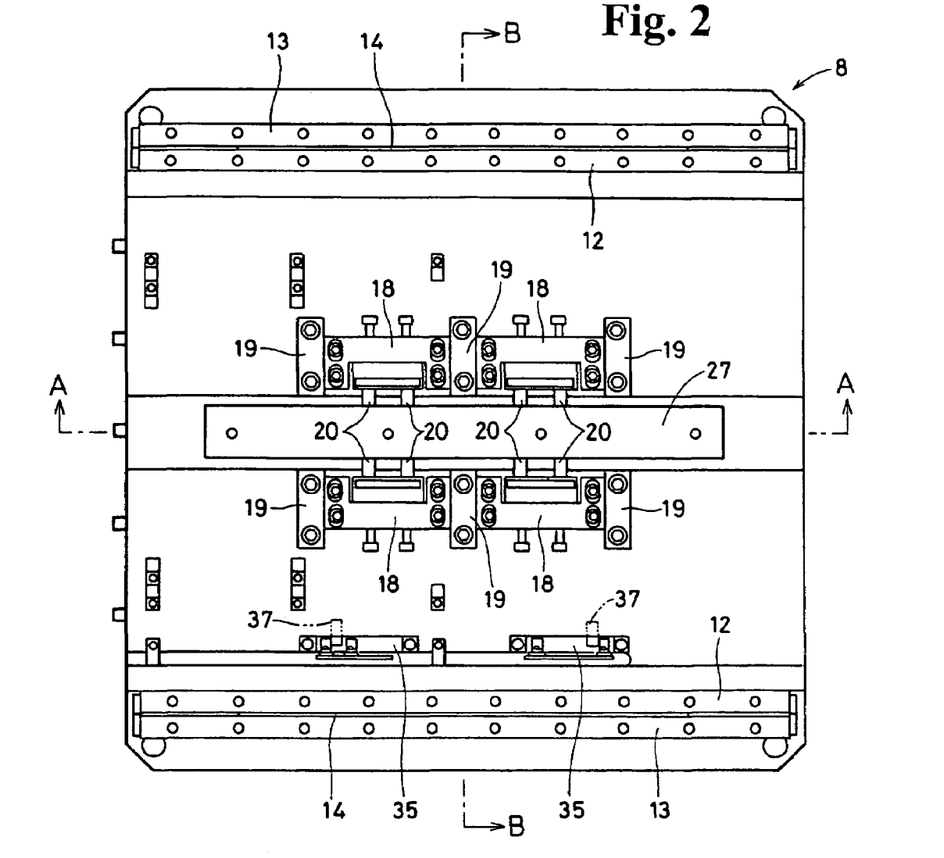
FIG. 2 is a plan view of the base of an X-axis stage drive apparatus.
Figure 3:
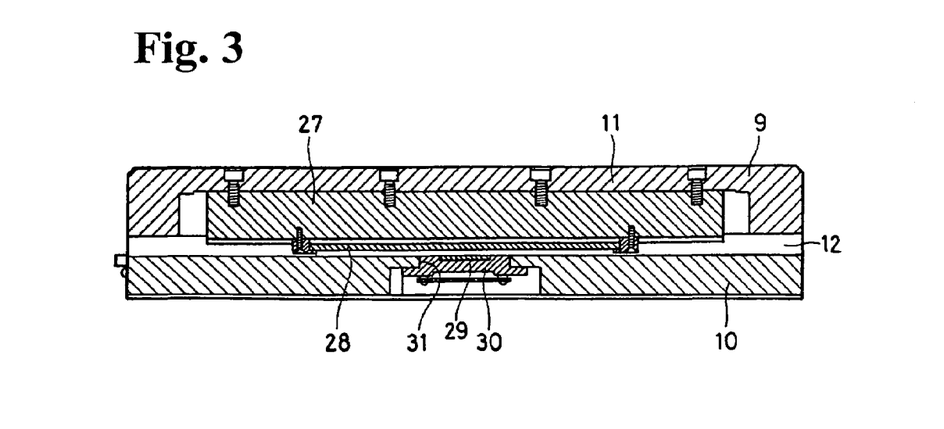
FIG. 3 is a cross-sectional view of the X-axis stage drive apparatus taken through a line A—A in FIG. 2.
Figure 4:
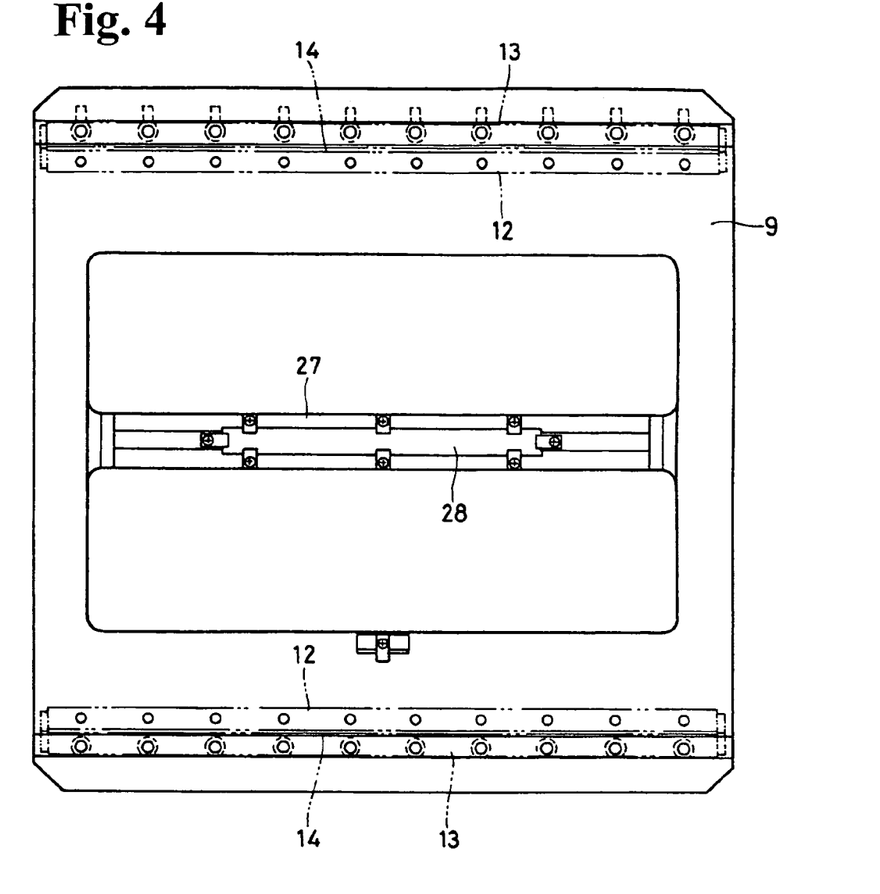
FIG. 4 is a base plan diagram of the X-axis stage.
Figure 5:
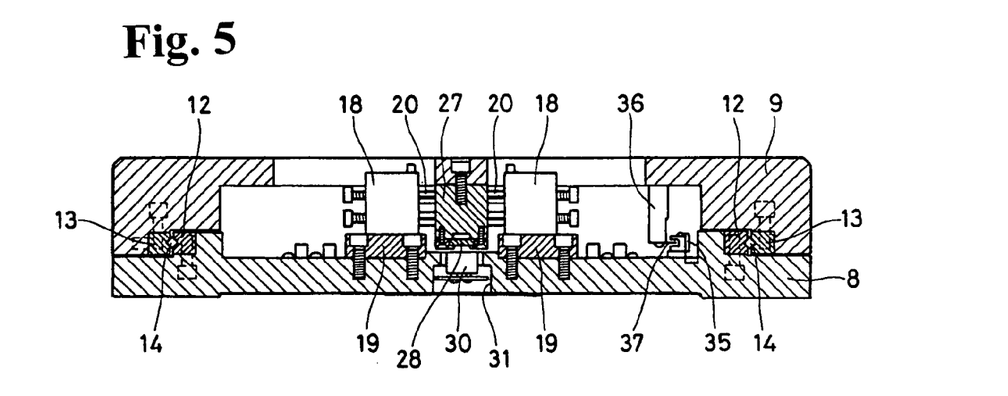
FIG. 5 is a cross-sectional diagram of the X-axis stage drive apparatus taken through a line B—B in FIG. 2.

As mentioned above, the displacement mechanism of the X-axis stage 9 shown in FIG. 2–FIG. 5 is substantially identical to the aforesaid displacement mechanism of the Y-axis stage 11. Here, as the Y-axis base 10 and Y-axis stage 11 are mounted on the X-axis stage 9, the load during the drive operation increases. To handle the load increase, a pair of the drive units 18 are installed respectively on both sides to drive the moving element 27, as shown in FIG. 2. The remaining features of the construction are identical to those of the displacement mechanism of the Y-axis stage 11.

Next, the construction of the drive circuits of the drive units 18 will be described referring to FIG. 10. The drive legs 21, 22 of the drive units 18 are driven via a control circuit 41 and corresponding drive circuits 42, 43. When predetermined sine wave drive voltages are applied to the extension/contraction deforming part 23 and shear deforming part 24 of the drive legs 21, 22 of the drive units 18 by the drive circuits 42, 43 via the control circuit 41, the drive legs 21, 22 generate a drive force. Due to this drive force, the moving element 27 is driven in the drive direction, and the stage 11 to which the moving element 27 is attached moves in the drive direction. The displacement amount at this time is detected by the linear scale 28 and detecting head 29, and fed back to the control circuit 41 via a detecting circuit 53. Hence, the moving element is moved to a predetermined position while the control circuit 41 feedback controls the displacement amount of the stage 11.

Figure 11:
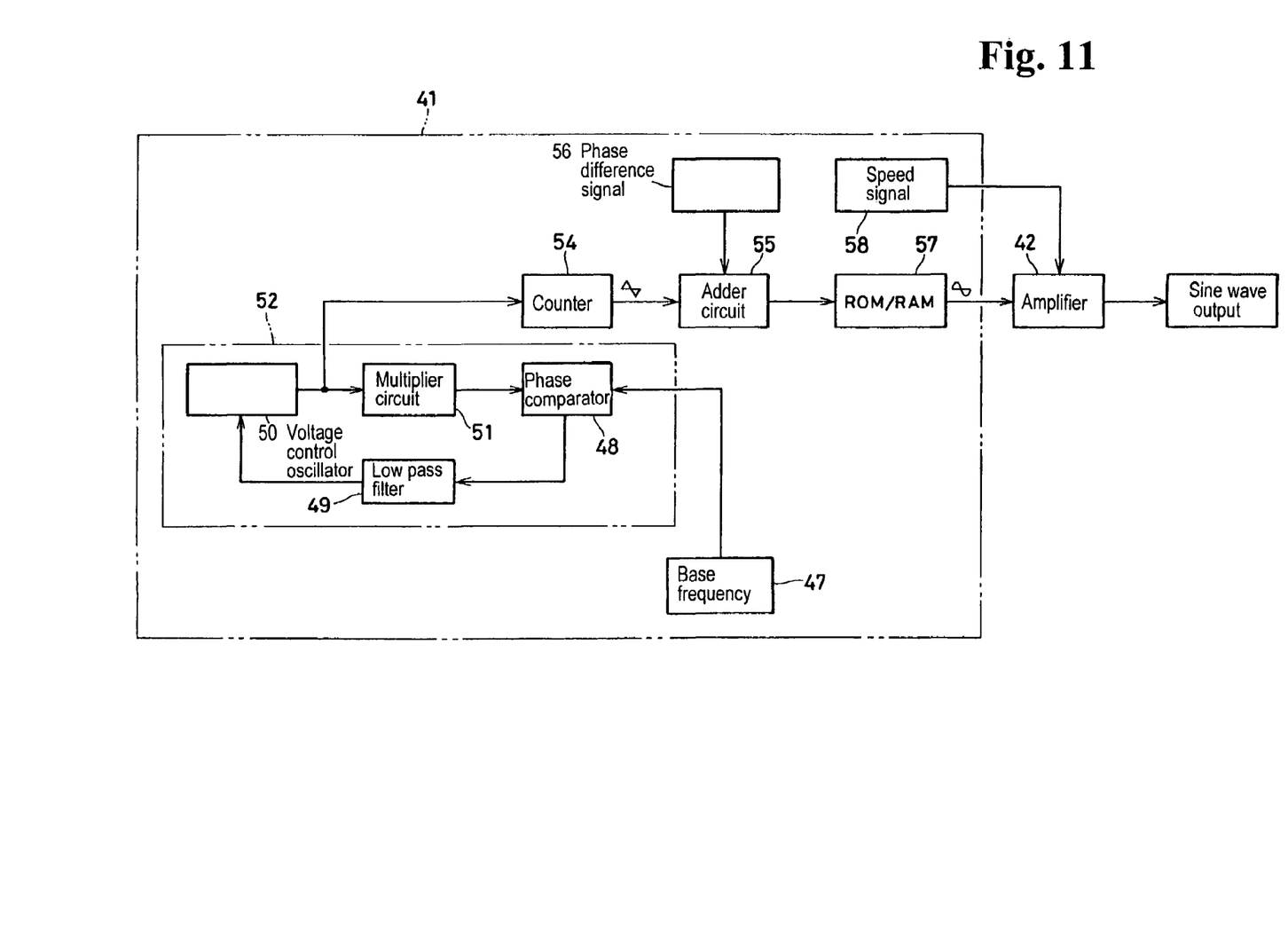
FIG. 11 is a block diagram showing the construction of a control circuit.
Figure 12:
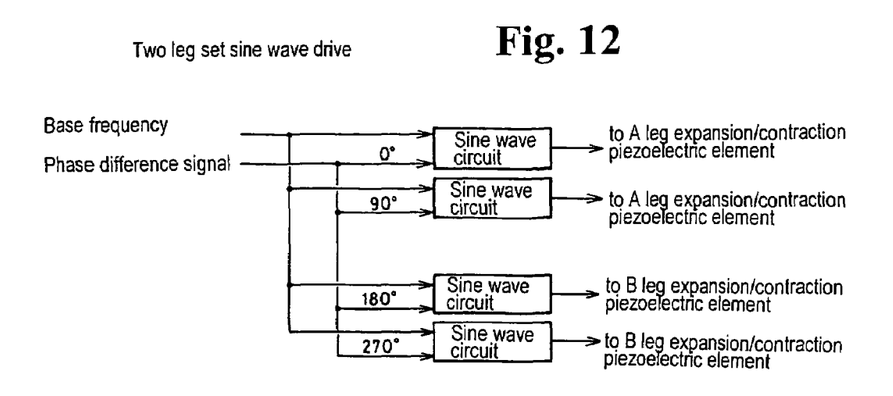
FIG. 12 is a block diagram of sine wave drive of the drive legs in a two leg set.

Next, describing the detailed construction of the control circuit 41, the control circuit 41 comprises a base frequency generating circuit 47, phase comparator 48, low pass filter 49, voltage control oscillator 50 and multiplier circuit 51, the phase comparator 48, low pass filter 49, voltage control oscillator 50 and multiplier circuit 51, forming a PLL 52 as shown in FIG. 11.

The control circuit 41 further comprises a counter 54, adder circuit 55, phase difference signal generating circuit 56, ROM/RAM 57 and speed signal generating circuit 58.

Next, the drive operation for the Y-axis stage 11 on the Y-axis base 10 of the stage drive apparatus having the aforesaid construction will be described. FIG. 10 shows the principle of the mechanism which drives the stage 11 by the drive units 18 provided on the base 10. Herein, the extension/contraction deforming part 23 and shear deforming part 24 of the drive legs 21, 22 of the drive units 18 are operated alternately with mutually opposite phases, and the stage 11 is moved in the Y-axis direction so that the tips of the pair of drive legs 21, 22 kick the moving element 27 of the stage 11.

Now, when a voltage is applied to the extension/contraction deforming part 23 of the drive leg 21, it extends, and the tip of the drive leg 21 touches the moving element 27. When, in this state, the shear deforming part 24 is given a shearing deformation, the tip of the drive leg 21 gives a drive force to the moving element 27 in the drive direction. At this time, as the extension/contraction deforming part 23 of the drive leg 22 on the opposite side is contracted, the tip of the drive leg 22 is separated from the moving element 27. The shear deforming part 24 of the drive leg 22 whereof the tip is separated from the moving element 27 then undergoes a shear deformation in the opposite direction in preparation for the next drive action.

By sequentially repeating this operation alternately for the two drive legs 21, 22, the Y-axis stage 11 having the moving element 27 moves in the Y-axis direction shown by the arrow in FIG. 10. At this time, the stage 11 is guided by the rails 12 and the rollers 14.

By driving the moving element 27 by the drive legs 21, 22 of the drive units 18, the Y-axis stage 11 to which the moving element 27 is attached moves in the horizontal or lateral direction, i.e., the Y-axis direction, in FIG. 6–FIG. 8. This displacement of the stage 11 is read by the detecting head 29 fitted to a part of the opening 31 of the base 10 via the head base 30 which reads the graduations of the linear scale 28 fitted to the base part of the moving element 27.

Thus, the position of the stage 11 which is displaced by the drive units 18 is detected by the linear scale 28 and detecting head 29. The maximum stroke of the stage 11 at this time is limited to a position detected by the pair of limit sensors 35 provided on the side of the base 10. When the stage 11 displaces by a large amount in the Y-axis direction, the detection plate 37 is detected by the limit sensors 35, and the drive of the stage 11 stops in this position. Therefore, the rollers 14 disposed between the pairs of rails 12, 13 forming the cross-roller do not fall out.

This complete the description of the drive operation for the Y-axis stage 11, but the X-axis stage 9 shown in FIG. 2–FIG. 5 is driven in an identical way. Specifically, the X-axis stage 9 is driven in the X-axis direction by a total of four drive units 18 (FIG. 2) whereof one pair each is provided to the left and right on the base 8. Therefore, the X-axis stage 9 driven in the X-axis direction and the Y-axis stage 11 driven in the Y-axis direction form an X-Y stage which can be positioned as desired in the X-axis direction and Y-axis direction.

In order to drive the drive legs 21, 22 which drive the Y-axis stage 11 or X-axis stage 9, sine wave drive voltages are respectively applied to the extension/contraction deforming part 23 and shear forming part 24 of the drive legs 21, 22 by the circuits shown in FIG. 10 and FIG. 11.

The base frequency generating circuit 47 in FIG. 11 generates, for example, a 1 MHz pulse, and this pulse is applied to the phase comparator 48. The phase comparator 48 compares this base frequency with the phase of, for example, a 25 MHz pulse generated by the multiplier circuit 51, and after cutting out high frequency components with the low pass filter 49, the output is applied to the voltage control oscillator 50. Herein, if the phase of the oscillator 50 is not correct, its frequency is converted and its output is supplied to the multiplier circuit 51.

Simultaneously, the output of the voltage control oscillator 50 is supplied as a pulse to a counter 54. The counter 54 counts the pulses output by the oscillator 50, and forms an up/down signal, e.g., a 30 KHz triangular wave based on this count. This triangular wave is supplied to an adder circuit 55, and here, its phase is changed according to a phase difference signal applied by the phase difference signal generating circuit 56 to output a phase difference of 90°, 210° or the like. The triangular wave with modified phase is then applied to the ROM/RAM 57.

The ROM/RAM 57 comprises a waveform rectifying circuit comprising comparison data for the triangular wave level and sine wave level, and it converts the triangular wave to a sine wave. Due to this, a sine wave is generated by the ROM/RAM 57, the sine wave is amplified by an amplifier 42, and the sine wave is output. Also, a speed signal is applied to the amplifier 42 by the speed signal generating circuit 58. Thus, the amplifier 42 outputs a voltage sine wave form according to the speed signal. This sine wave output is applied to the extension/contraction deforming parts 23 and shear deforming parts 24 of the drive legs 21, 22, as shown in FIG. 10. Therefore, the extension/contraction deforming parts 23 of the drive legs 21, 22 sequentially undergo extension and contraction, and the shear deforming parts 24 sequentially undergo a shear deformation.

Herein, when there is one pair, i.e., two types, of the drive legs 21, 22 which drive the moving element 27, as shown in FIG. 21, the phases of the drive voltages applied to the extension/contraction deforming part 23 and shear deforming part 24 of the drive legs 21, 22 of each type are mutually offset by 90°. The drive voltage applied to the extension/contraction deforming part 23 of the A leg 21, and the drive voltage applied to the extension/contraction deforming part 23 of the B leg 22, are mutually offset by 180°. Also, the drive voltage applied to the shear deforming part 24 of the A leg 21, and the drive voltage applied to the shear deforming part 24 of the B leg 22, are mutually offset by 180°. Therefore, the variations in the drive voltages applied to the extension/contraction deforming parts 23 and shear deforming parts 24 of the A leg and the B leg are as shown in FIG. 14.

Figure 13:
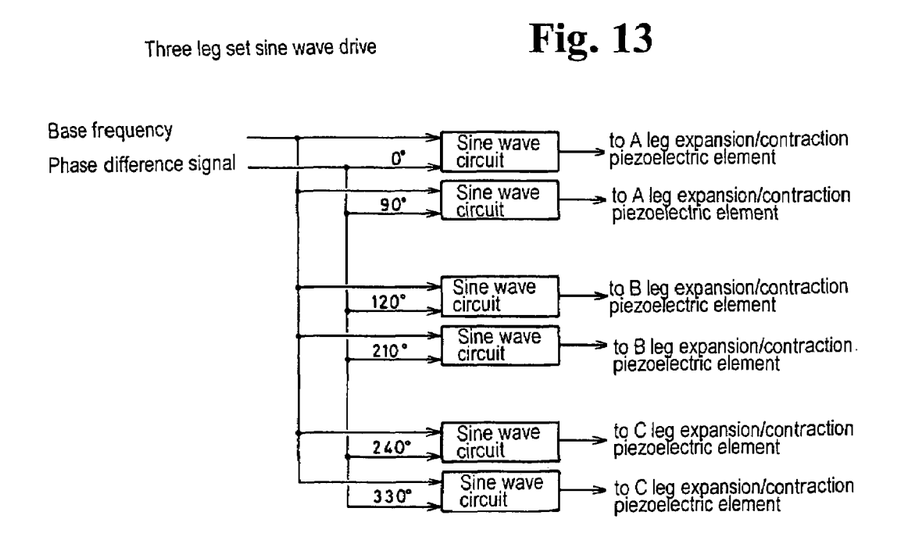
FIG. 13 is a block diagram of sine wave drive of the drive legs in a three leg set.

When three types of drive legs are used to drive the moving element 27, the result is as shown in FIG. 13. Herein, the drive voltages applied to the extension/contraction deforming parts 23 and shear deforming parts 24 of the drive legs of each type have a phase difference of 90°. The phase difference between the extension/contraction deforming parts 23 of the three types of drive legs is 120°. Also, the phase difference between each of the drive voltages applied to the shear deforming parts 24 of the three types of drive legs is 120°. Therefore, in this case, the variations in the drive voltages applied to the extension/contraction deforming parts 23 and shear deforming parts 24 of the three types of drive legs, i.e., the A leg, B leg and C leg, are as shown in FIG. 15.

Figure 16:
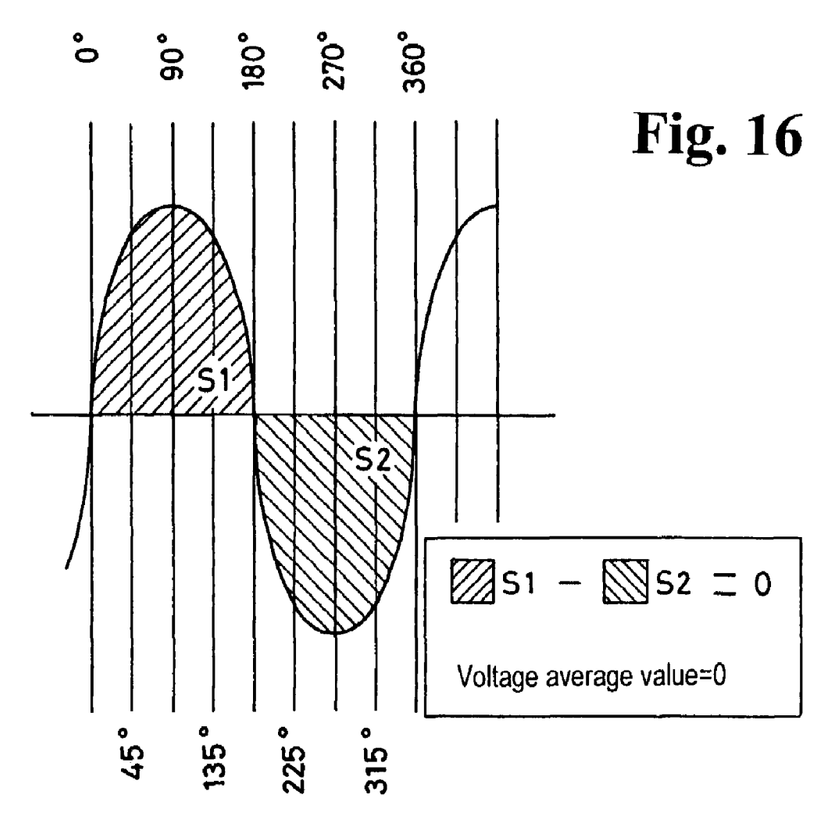
FIG. 16 is a waveform diagram of a sine wave.

Hence, as shown in FIG. 16, when the drive voltage applied to the extension/contraction deforming parts 23 and shear deforming parts 24 of two or three types of drive legs is a sine wave, the effect of the charge/discharge time constant of the piezoelectric elements 23, 24 is reduced, the extension time and contraction time are equal, and the integral of the voltages, i.e., the average value of the voltages, applied to the extension/contraction deforming parts 23 and shear deforming parts 24 of the drive legs, is effectively zero. Therefore, the lifetime of the extension/contraction deforming parts 23 and shear deforming parts 24 of the drive legs is lengthened, and the reliability of the feed drive apparatus is thereby improved.

Figure 14:
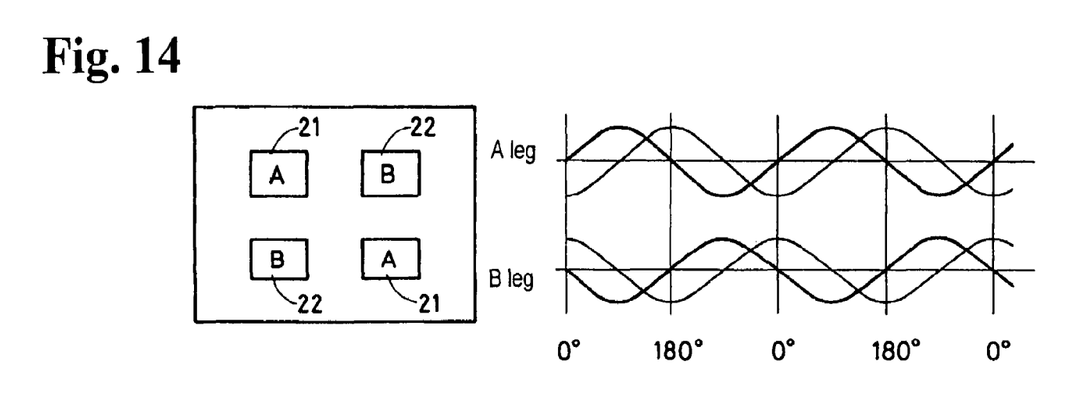
FIG. 14 is a waveform diagram of sine wave drive in a two leg set.
Figure 17:
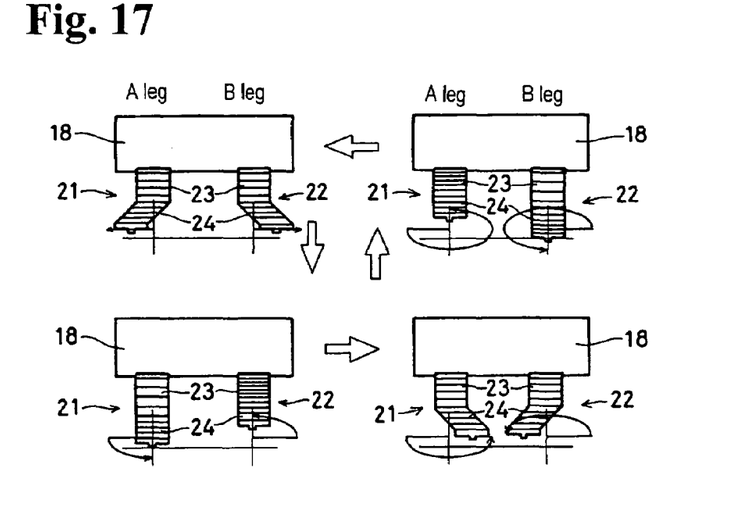
FIG. 17 is a front view showing the operation of the drive legs in a two leg set.
Figure 18:
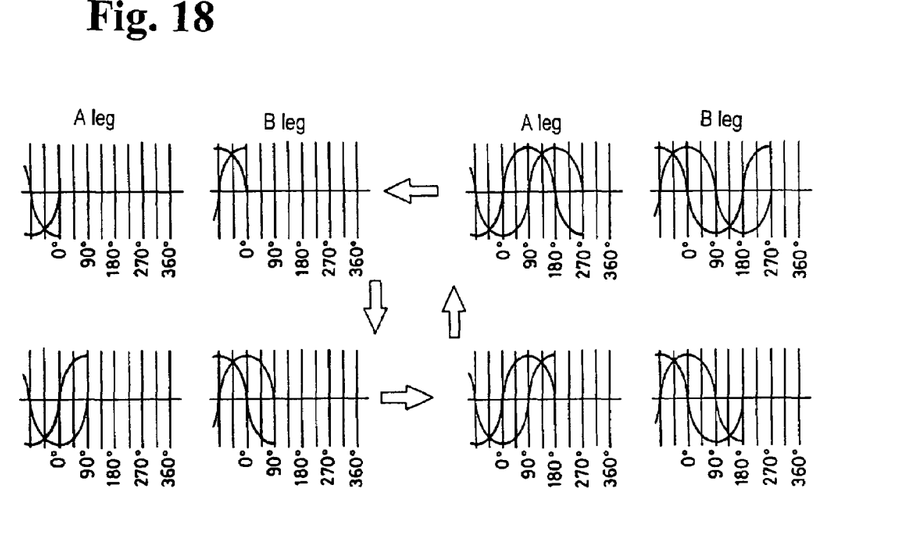
FIG. 18 is a waveform diagram of the drive voltage for the drive leg set shown in FIG. 17.

FIG. 17 and FIG. 18 show what happens when the sine wave voltage shown in FIG. 14 is applied to the extension/contraction deforming parts 23 and shear deforming parts 24 of the A leg 21 and B leg 22 forming the drive legs. Here, it should be noted that the tips of the drive legs 21, 22 both move along elliptical paths. As they move along elliptical paths, when the drive leg 21 is undergoing shear deformation to drive the moving element 27, the extension/contraction deforming part 23 of the drive leg 21 is fully extended. Conversely, the extension/contraction deforming part 23 of the drive leg 22 on the opposite side is effectively completely contracted, so its tip is separated from the moving element. Due to this, unnecessary slipping is prevented, and the load on the drive power supply is reduced.

Figure 15:
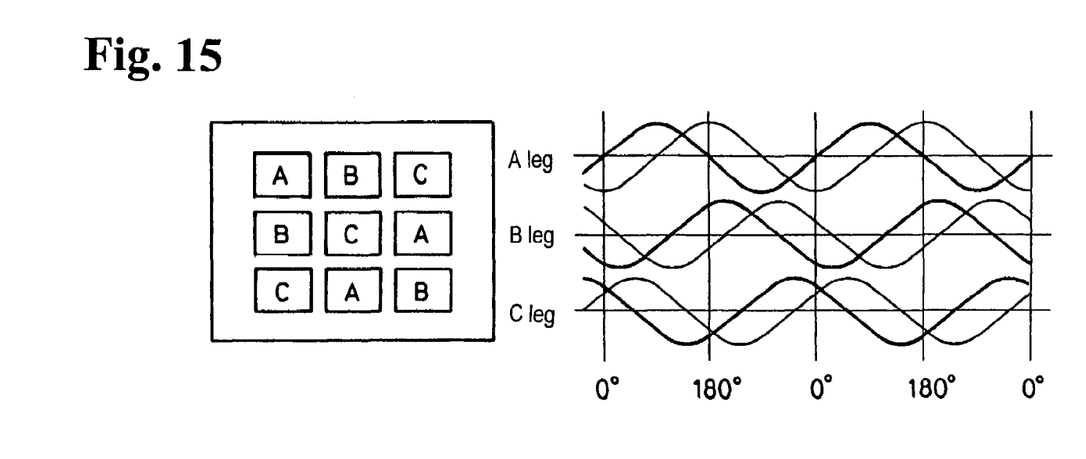
FIG. 15 is a waveform diagram of sine wave drive in a three leg set.
Figure 19:
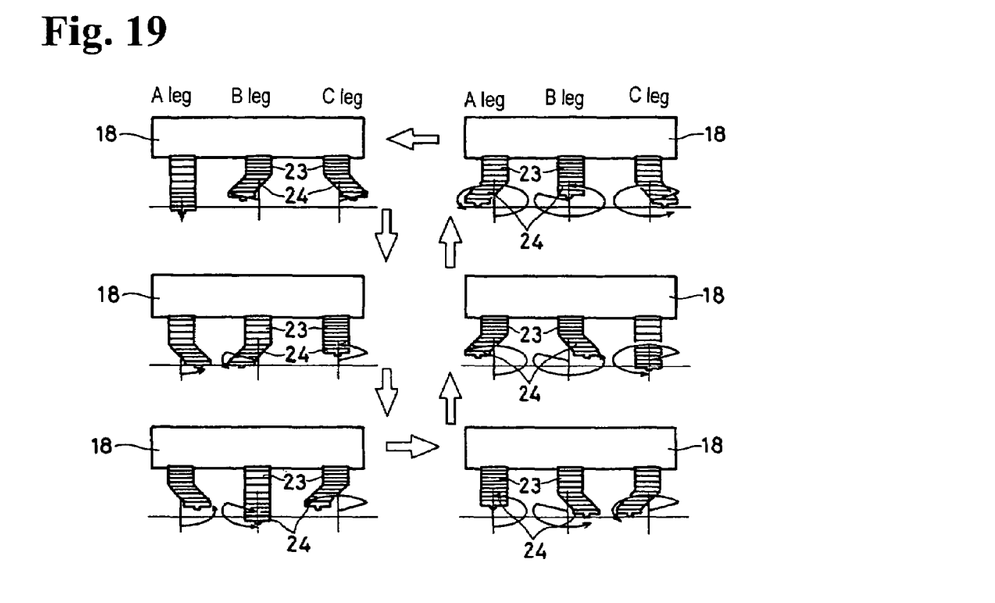
FIG. 19 is a front view showing the operation of the drive legs in a three leg set.
Figure 20:
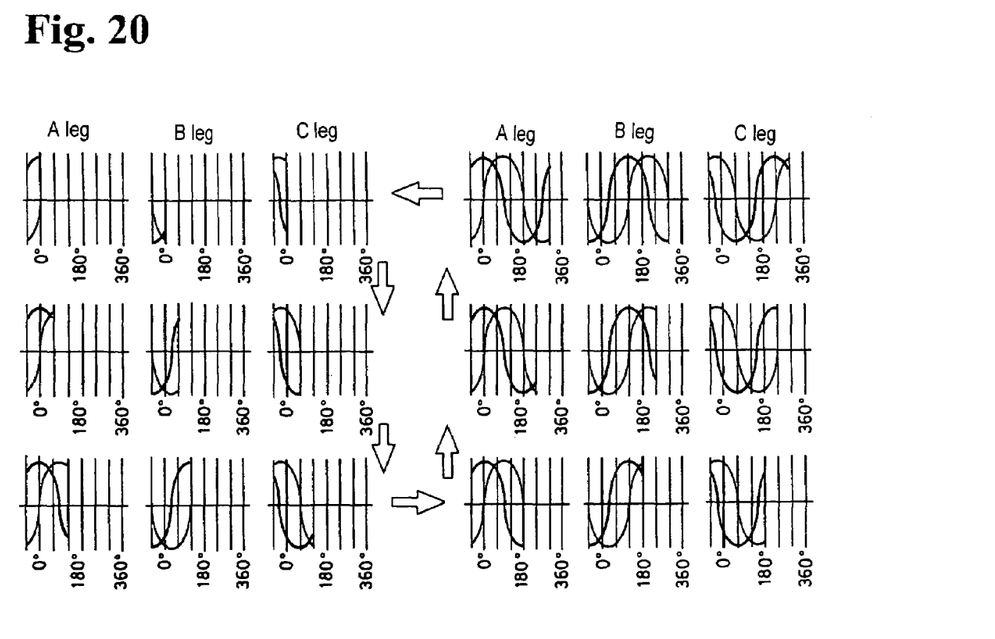
FIG. 20 is a waveform diagram of drive voltages.

FIG. 19 and FIG. 20 show the situation when three types of drive legs, i.e., A leg, B leg and C leg are provided, and the sine wave voltage shown in FIG. 15 is applied to the extension/contraction deforming parts 23 and shear deforming parts 24 of these drive legs. Here too, the tips of the three types of drive legs trace elliptical paths. Moreover, one of the three types of drive legs is always in contact with the moving element 27, so the moving element 27 is no longer unrestrained. Therefore, a high speed drive can be achieved with no further loss of precision.

Thus, in the feed drive apparatus shown in FIG. 19 and FIG. 20, by applying a sine wave drive voltage to each of the drive legs by drive circuits of simple construction, and by specifically increasing the voltage applied to the shear deforming parts 24, the deformation amount in the drive direction is increased and high speed drive is possible. Even during a high speed drive operation, the moving element 27 is always held in contact with one of the drive legs, and a high degree of positional control can therefore be maintained. Moreover, as the duty ratio is still 1:1, depolarization factors are eliminated, and the lifetime of the drive legs is thereby extended.

The invention of this application has been described with reference to the embodiments shown in the drawings, but it will be understood that the invention of this application is not limited to these embodiments, various modifications being possible within the scope and spirit of this invention. For example, in the aforesaid embodiments, the drive speed was varied by varying the magnitude of the voltage applied to the shear deforming parts 24 of the drive legs 21, 22, but the drive speed may be varied also by varying the frequency of the drive voltages applied to the extension/contraction deforming parts 23 and the shear deforming parts 24. Further, the drive legs are not limited to two types or three types, and may comprise four or more types.

INDUSTRIAL FIELD OF APPLICATION

The feed drive apparatus of this invention may be used as a drive source in a wide variety of actuators. The feed drive apparatus of this invention may also be used as a drive means in a stage for positioning a workpiece mounted thereon in a machining device. In particular, it may be used as a feed drive apparatus for positioning a stage in an electronic beam image tracer, the sample platform drive mechanism in a scanning electron microscope, or the workpiece stage in an ion beam irradiation drive apparatus.

What is claimed is:

1. A feed drive apparatus comprising drive leg having an extension/contraction deforming part and a shear deforming part, said extension/contraction deforming part being extended so that the tip of said drive leg comes in contact with a moving element or with a fixed side, and said shear deforming part deforms laterally by shear in the drive direction or the reverse direction to drive a moving element, wherein sine wave drive voltages are respectively applied to said extension/contraction deforming part and said shear deforming part, and the mean values of drive voltages applied to the extension/contraction deforming part and the shear deforming part are substantially zero.

2. The feed drive apparatus according to claim 1, wherein the phase of the sine wave drive voltage applied to said extension/contraction deforming part and the phase of the sine wave drive voltage applied to said shear deforming part are mutually offset by approximately 90°.

3. The feed drive apparatus according to claim 1, comprising n types of drive legs, wherein the phases of the drive voltages applied to extension/contraction deforming parts and shear deforming parts of different types of drive legs are mutually offset by 360°/n.

4. The feed drive apparatus according to claim 1, comprising two types of drive legs, wherein the phases of the drive voltages applied to said extension/contraction deforming parts and said shear deforming parts of these two types of drive legs are mutually offset by approximately 180°, and the phases of the drive voltages applied to said extension/contraction deforming part and said shear deforming part of each drive leg are mutually offset by approximately 90°.

5. The feed drive apparatus according to claim 1, comprising three types of drive legs, wherein the phases of the drive voltages applied to said extension/contraction deforming parts and said shear deforming parts of these three types of drive legs are mutually offset by approximately 120°, and the phases of the drive voltages applied to said extension/contraction deforming part and said shear deforming part of each drive leg are mutually offset by approximately 90°.

6. A feed drive apparatus comprising drive leg having an extension/contraction deforming part and a shear deforming part, said extension/contraction deforming part being extended so that the tip of said drive leg comes in contact with a moving element or with a fixed side, and said shear deforming part deforms laterally by shear in the drive direction or the reverse direction to drive said moving element, wherein sine wave drive voltages are respectively applied to said extension/contraction deforming part and said shear deforming part, the mean values of drive voltages applied to the extension/contraction deforming part and the shear deforming part are substantially zero, and the tip of said drive leg moves along an elliptical path.

7. A feed drive apparatus comprising drive leg having an extension/contraction deforming part and a shear deforming part, said extension/contraction deforming part being extended so that the tip of said drive leg comes in contact with a moving element or with a fixed side, and said shear deforming part deforms laterally by shear in the drive direction or the reverse direction to drive said moving element, wherein sine wave drive voltages are respectively applied to said extension/contraction deforming part and said shear deforming part, the mean values of drive voltages applied to the extension/contraction deforming part and the shear deforming part are substantially zero, the drive legs are disposed on either side of said moving element so that they are effectively facing each other substantially at right angles to the drive direction of said moving element, and said moving element is gripped by said drive legs on either side when it is driven.

8. The feed drive apparatus according to claim 7, wherein said drive legs are attached to the base side, and said moving element is installed on a stage supported free to move in the drive direction relative to the base.

9. The feed drive apparatus according to claim 8, wherein an X-axis stage and Y-axis stage are superimposed, the X-axis stage and Y-axis stage are supported free to move respectively in the X-axis direction and Y-axis direction, and the X-axis stage and Y-axis stage are respectively driven by said X-axis drive leg and Y-axis drive leg in the X-axis direction and Y-axis direction respectively.

* * * * *